United States Patent
Pettersson et al.

(10) Patent No.: US 7,555,375 B2
(45) Date of Patent: Jun. 30, 2009

(54) SENSOR SYSTEM

(75) Inventors: Matti Pettersson, Helsingborg (SE);
Leif Arvidsson, Landskrona (SE);
Anders Persson, Asmundtorp (SE)

(73) Assignee: Haldex Brake Products AB (SE)

( * ) Notice: Subject to any disclaimer, the term of this patent is extended or adjusted under 35 U.S.C. 154(b) by 52 days.

(21) Appl. No.: 11/301,683

(22) Filed: Dec. 13, 2005

(65) Prior Publication Data
US 2006/0149440 A1    Jul. 6, 2006

Related U.S. Application Data

(63) Continuation of application No. PCT/SE2004/000939, filed on Jun. 14, 2004.

(30) Foreign Application Priority Data

Jun. 13, 2003   (SE)   .................................... 0301727

(51) Int. Cl.
F16D 66/02   (2006.01)
F16D 51/00   (2006.01)

(52) U.S. Cl. ............................. 701/30; 701/29; 701/31; 188/1.11 L; 188/1.11 W; 188/79.54

(58) Field of Classification Search ............. 701/29–31, 701/45, 70; 188/1.11 L, 1.11 W, 79.54; 303/122.03
See application file for complete search history.

(56) References Cited

U.S. PATENT DOCUMENTS

| | | | |
|---|---|---|---|
| 3,776,329 A * | 12/1973 | Hope et al. | 188/1.11 R |
| 4,205,603 A * | 6/1980 | Baker, Jr. | 100/35 |
| 4,280,594 A * | 7/1981 | Baum | 188/1.11 W |
| 4,557,355 A * | 12/1985 | Wilke et al. | 188/173 |
| 4,570,736 A * | 2/1986 | Waldorf | 180/423 |
| 4,606,435 A * | 8/1986 | Johnson | 188/1.11 L |
| 4,677,420 A * | 6/1987 | Topic et al. | 340/454 |

(Continued)

FOREIGN PATENT DOCUMENTS

AU    200182092 A * 2/2002

(Continued)

OTHER PUBLICATIONS

Shinmura Tomoyuki, Obstruction avoidance and movement control apparatus of vehicle, Jun. 24, 1999 from DialogClassic Web(tm) file 324, acc. No. 0003534473.*

(Continued)

*Primary Examiner*—Cuong H Nguyen
(74) *Attorney, Agent, or Firm*—St. Onge Steward Johnston & Reens LLC

(57) ABSTRACT

The present invention concerns a sensor system for monitoring at least the wear of lining material of a disc brake. It may also be used to monitor the stroke of the brake actuator. The sensor system receives signals from a first external and/or internal means and a second sensor means indicative of at least two different conditions of the brake. The major part of the sensor system is received on a cap to be fixed to the caliper and giving a measuring reference. The first means monitors the occurrence of a brake movement. The second sensor means monitors the actual position of a part indicating the wear of the brake lining material and/or the stroke of the brake actuator.

5 Claims, 4 Drawing Sheets

U.S. PATENT DOCUMENTS

| | | | | |
|---|---|---|---|---|
| 4,681,194 | A | * | 7/1987 | Tsuruta .................... 188/71.9 |
| 4,809,824 | A | * | 3/1989 | Fargier et al. .............. 188/72.8 |
| 4,850,454 | A | * | 7/1989 | Korody .................. 188/1.11 L |
| 4,921,076 | A | * | 5/1990 | Grenier et al. ............. 188/72.6 |
| 4,992,944 | A | * | 2/1991 | Noto et al. .................... 701/41 |
| 5,009,292 | A | * | 4/1991 | Hoffman et al. ........... 188/71.7 |
| 5,161,650 | A | * | 11/1992 | Taig ........................ 188/72.8 |
| 5,207,299 | A | * | 5/1993 | Feldmann ................ 188/79.55 |
| 5,233,528 | A | * | 8/1993 | Phipps et al. .................. 701/79 |
| 5,848,672 | A | * | 12/1998 | Brearley et al. ......... 188/1.11 L |
| 5,848,673 | A | | 12/1998 | Strauss et al. .............. 188/1.11 |
| 5,934,395 | A | * | 8/1999 | Koide et al. ................. 180/65.2 |
| 5,992,579 | A | * | 11/1999 | Kyrtsos .................. 188/79.52 |
| 6,047,793 | A | * | 4/2000 | Hasegawa et al. ...... 188/1.11 W |
| 6,105,730 | A | | 8/2000 | Ekeroth ..................... 188/1.11 |
| 6,255,941 | B1 | * | 7/2001 | Osterman et al. ........... 340/479 |
| 6,257,374 | B1 | * | 7/2001 | Strzelczyk et al. ...... 188/1.11 L |
| 6,276,494 | B1 | | 8/2001 | Ward et al. ................. 188/1.11 |
| 6,279,690 | B1 | * | 8/2001 | Schaffer .................... 188/71.9 |
| 6,341,670 | B1 | | 1/2002 | Leblanc et al. ............. 188/1.11 |
| 6,352,137 | B1 | * | 3/2002 | Stegall et al. ........... 188/1.11 L |
| 6,397,977 | B1 | * | 6/2002 | Ward ...................... 188/1.11 L |
| 6,417,768 | B2 | * | 7/2002 | Osterman et al. ........... 340/479 |
| 6,480,107 | B2 | * | 11/2002 | Stonehocker et al. ....... 340/479 |
| 6,634,465 | B1 | * | 10/2003 | Tuschen ................. 188/1.11 L |
| 6,722,477 | B1 | * | 4/2004 | Wolfsteiner et al. ........ 188/72.9 |
| 7,032,721 | B2 | * | 4/2006 | Baumgartner .............. 188/71.9 |
| 7,152,716 | B2 | * | 12/2006 | Taylor et al. ................ 188/71.8 |
| 7,182,184 | B2 | * | 2/2007 | Baumgartner ............... 188/156 |
| 7,413,061 | B2 | * | 8/2008 | Wagner et al. ............. 188/72.9 |
| 7,419,035 | B2 | * | 9/2008 | Fuderer et al. ............. 188/71.9 |
| 2001/0030602 | A1 | | 10/2001 | Osterman et al. ........... 340/453 |
| 2001/0035820 | A1 | * | 11/2001 | Osterman et al. ........... 340/453 |
| 2001/0042659 | A1 | * | 11/2001 | Kramer ................. 188/1.11 R |
| 2002/0075147 | A1 | | 6/2002 | Stonehocker et al. ....... 340/453 |
| 2002/0104717 | A1 | * | 8/2002 | Borugian ................ 188/1.11 E |
| 2002/0104720 | A1 | * | 8/2002 | Borugian ................. 188/79.56 |
| 2002/0195298 | A1 | * | 12/2002 | Borugian .............. 188/1.11 W |
| 2003/0084714 | A1 | | 5/2003 | Chang et al. ................... 73/121 |
| 2005/0082122 | A1 | * | 4/2005 | Taylor et al. ............ 188/1.11 L |
| 2005/0252727 | A1 | * | 11/2005 | England et al. ......... 188/1.11 L |
| 2006/0149440 | A1 | * | 7/2006 | Pettersson et al. ............. 701/30 |
| 2006/0219486 | A1 | * | 10/2006 | Wagner et al. .......... 188/1.11 L |
| 2008/0073161 | A1 | * | 3/2008 | Pettersson et al. ....... 188/1.11 L |

FOREIGN PATENT DOCUMENTS

| | | | | |
|---|---|---|---|---|
| BR | 200107122 | A | * | 6/2002 |
| DE | 3341182 | A1 | * | 5/1985 |
| DE | 3866946 | G | * | 1/1992 |
| DE | 10139903 | A1 | * | 4/2002 |
| EP | 291429 | A | * | 11/1988 |
| EP | 0 978 665 | | | 2/2000 |
| ES | 2028345 | T3 | * | 7/1992 |
| FR | 2615259 | A | * | 11/1988 |
| JP | 60-045539 | | * | 3/1985 |
| JP | 02089826 | A | * | 3/1990 |
| JP | 07-268922 | | * | 10/1995 |
| JP | 08-235063 | | * | 9/1996 |
| JP | 11198795 | A | * | 7/1999 |
| WO | WO 2004111484 | A1 | * | 12/2004 |

OTHER PUBLICATIONS

Dr. Boll Wolf, Disc brake for the wheels of a motor vehicle, Aug. 18, 1994, from DialogClassic Web(tm) file 324, acc. No. 0003041768.*

The use of infrared imaging in industry by Christine Connolly, Journal: Assembly Automation, ISSN: 0144-5154, Year: 2005 vol. 25 Issue: 3 p. 191-195, DOI: 10.1108/01445150510610908, Publisher: Emerald Group Publishing Limited.*

Richard Seremak, see http://home.planet.nl/~serem000/extra.html, richard.jeanet@wxs.nl, Copyright © 2000, Richard Seremak, Last Updated—Apr. 19, 2000 12:00:00.*

Application of a sliding mode control to anti-lock brake system; Seunghwan Baek; Jeonghoon Song; Duksun Yun; Heungseob Kim; Kwangsuck Boo; Control, Automation and Systems, 2008. ICCAS 2008. International Conference on; Oct. 14-17, 2008 pp. 307-311; Digital Object Identifier 10.1109/ICCAS.2008.4694661.*

Comparison of three types of permanent magnet linear eddy current brake according to magnetization pattern; Jang, S.M.; Lee, S.H.; Cho, S.K.; Cho, H.W.; Magnetics Conference, 2003. INTERMAG 2003. IEEE International; Mar. 28-Apr. 3, 2003 p. GQ-09; Digital Object Identifier 10.1109/INTMAG.2003.1230846.*

Fast fire/heat detection and suppression for railroad vehicles; Pier, J.R.; Preiser, M.; Railroad Conference, 1996., Proceedings of the 1996 ASME/IEEE Joint; Apr. 30-May 2, 1996 pp. 59-65; Digital Object Identifier 10.1109/RRCON.1996.507959.*

Syntegra™—next generation traction drive system, total integration of traction, bogie and braking technology;Germishuizen, J.; Jockel, A.; Hoffmann, T.; Teichmann, M.; Lowenstein, L.; Wangelin, F.V.;Power Electronics, Electrical Drives, Automation and Motion, 2006. SPEEDAM 2006. International Symposium on;May 23-26, 2006 pp. 1073-1077.*

The Wheel Abrasion Experiment—how abrasive is the Martian dust?; Ferguson, D.C.; Energy Conversion Engineering; Conference, 1997. IECEC-97. Proceedings of the 32nd Intersociety; vol. 1, Jul. 27-Aug. 1, 1997 pp. 734-737 vol. 1 Digital Object Identifier 10.1109/IECEC.1997.659282.*

* cited by examiner

SENSOR SYSTEM

CROSS-REFERENCE TO RELATED APPLICATIONS

This application is a continuation of International Patent Application No. PCT/SE2004/000939 filed on Jun. 14, 2004, which designates the United States and claims priority of Swedish Patent Application No. 0301727-4 filed on Jun. 13, 2003.

FIELD OF THE INVENTION

The present invention concerns a sensor system for monitoring the wear of lining material of a disc brake and possibly further conditions of the disc brake. The invention is primarily developed for disc brakes for heavy-duty road vehicles, but a person skilled in the art realises that it may be used for any kind of vehicle. The sensor system is intended for use at both pneumatically, hydraulically and electromechanically actuated brakes. Sensors monitoring the wear of the brake lining material are often referred to as pad wear sensors (PWS).

BACKGROUND OF THE INVENTION

Several different types of indicators or sensors for monitoring the wear of the brake lining of a brake pad or the like are known. In principle the known sensors operate in two different ways for monitoring wear of brake linings. The first way is to use a sensor that measures directly on the brake lining. The second way is to use a sensor that monitors the position or movement of a part indicative of the wear of the brake linings. The present invention concerns a sensor element monitoring the position of a part, indicative of the wear of the brake linings. It should be noted that in the latter case also the wear of the brake disc(s) and possible lining material of the brake disc(s) are included in the sensed wear. However, the wear of the brake disc(s) as such is normally negligible compared to the wear of the lining material. For simplicity of this description the wear is normally stated in reference to the brake lining material, which is the normal usage in the art. Thus, it is to be understood that also the wear of the disc(s) is included in general expressions regarding wear in this description.

Disc brakes are generally of two different types, which are referred to as disc brakes having a fixed caliper or a floating caliper. The present invention is applicable for both the above types of disc brakes.

The sensor system according to the present invention is normally to be applied in connection with an adjustment shaft. The adjustment shaft is a part of an adjustment mechanism, used to control the position of the brake pads in relation to the brake disc(s), as is well known in the art. As the lining of the brake pads wear off, the position of the brake pads in relation to the brake disc(s) is automatically adjusted, by means of the adjustment mechanism. Hereby the distance between the lining material and the brake disc(s) is kept more or less constant. The amount of rotation of the adjustment shaft or adjusting spindle is correlated to the distance the adjuster mechanism advances the brake pads towards the brake disc(s). Thus, the rotation of the adjustment shaft is an indicator of the wear of the brake pads of the disc brake.

When worn brake pads are to be replaced by new brake pads, the adjustment mechanism, and thus, the adjustment shaft, is brought back to a starting position. This is done to give room for the new thicker brake pads. The starting position is dependent on the thickness of the brake disc(s) and is due to the wear of the disc(s). Thus, the starting point could be used to monitor the wear of the brake disc(s).

SUMMARY OF THE INVENTION

According to the present invention a sensor system for monitoring at least the wear of lining material of disc brakes is provided. In the sensor system the position of an adjusting mechanism, a thrust plate or the like is used as an indication of the wear of lining material. The sensor system is mainly mounted in a way to use a caliper of the disc brake as a measuring reference and internal and/or external means are arranged indicating at least two different conditions of the brake.

According to a second aspect of the present invention a method for monitoring disc brakes is provided, sensing the position of an adjusting mechanism, a thrust plate or the like. The sensed position is used optionally and alternately to measure either the wear of the brake lining material or the stroke of the brake actuation. In this description the expression "stroke" is used in a broad sense, the measurements received are normally a combination of the actual stroke, elasticity and running clearance. It is possible to calculate the contribution of the different parts of the received signal, but it takes some computing capacity. Often it is enough to get an estimation of the stroke as such without an analysis of the different parts of the received signal. As used here "stroke" normally also includes elasticity, running clearance and possible other contributions.

One principle of the present invention is that the sensor system is designed to monitor two different conditions of the brake. One of said conditions is whether a braking is occurring. The other of said conditions is the actual position of the adjusting spindle or the like of the brake. In one example of an embodiment according to the invention a first and a second signal are given to the sensor system.

The means controlling if braking is occurring may more or less have the function of an on-off switch or the like, it may also be a logic circuit using any suitable algorithm to establish the possible occurrence of a brake movement. The means monitoring the actual position of the adjusting spindle may have many different forms, but is some kind of sensor means. Throughout this description the means controlling if braking is occurring is normally called the first means and the sensor monitoring the position of the adjusting spindle or the like is normally called the second sensor means.

The first means may be part of the sensor system as such or may be an external means. Thus, the first means of the sensor system is internal and/or external.

The first means is normally connected directly or indirectly to the lever arm. During braking the lever arm is moved and the position of the lever arm is an indication of whether the brake is actuated or not. Depending on the control and monitoring system of the vehicle, the first means may be replaced by an existing means of the vehicle indicative of the occurrence of braking. Thus, in such a case the first means is the control and monitoring system of the vehicle. In this latter case the sensor system as such includes no first means. As indicated above the first means may also be an algorithm in a logic circuit. The logic circuit may use any information available to establish if a brake movement is occurring or not. The information used by the logic circuit is for example given by the second sensor means, by existing signals in the control and monitoring system of the vehicle etc. The logic circuit may also use the latest available information.

The second sensor means is normally functioning in a linear fashion, i.e. it detects a linear movement.

A predetermined position or point for a part of the adjuster mechanism or the like in relation to another part of the brake is established. Said predetermined or predefined position is used as a fixed point or reference for measurement and is usually related to the caliper. Furthermore, the fixed point is normally the position when the brake is in the released condition but the fixed point could be any point during a brake movement. The first means could be used to establish the fixed point. If the fixed position is not confirmed it is taken as an indication that a braking is occurring. The measurement of the position of the adjusting spindle and thus the wear of the brake pad is taken at the fixed position all the time. Thus, measurements are only accepted when and if the two moving parts are at the predetermined fixed positions relative each other.

The value of the detected wear is stored in a memory. The memory is updated with every new measuring cycle. The value stored in the memory is always accessible for the control and monitoring system of the vehicle and, thus, for the driver.

The movement of the adjusting mechanism gives an indication of how well the brake is functioning. By using the signals from the second sensor means during an actual braking it is possible to analyse the function of the brake or if any part of the brake is broken. It is also possible to check that the brake is actually moving when braking is requested. E.g. it is possible to check the stroke, including running clearance and elasticity, of the brake actuation as indicated above.

To simplify the description the term "adjusting spindle" is normally used. However, the sensor system may be used on any part of the adjusting mechanism, the thrust plate etc. or any other part, the position of which is an indication of the wear of the brake lining. According to the present invention the position of the sensor system is taken in relation to the caliper. Thus, the caliper is used as a measuring reference.

A person skilled in the art realises that the second sensor means may have many different forms, as long as it monitors the position of the adjusting spindle or the like. Many different types of sensors are previously known.

Further objects and advantages of the present invention will be obvious for a person skilled in the art when reading the detailed description below of at present preferred embodiments.

BRIEF DESCRIPTION OF THE DRAWINGS

The invention will be described further below by way of examples and with reference to the enclosed drawings. In the drawings.

DETAILED DESCRIPTION OF THE INVENTION

Figure 1:
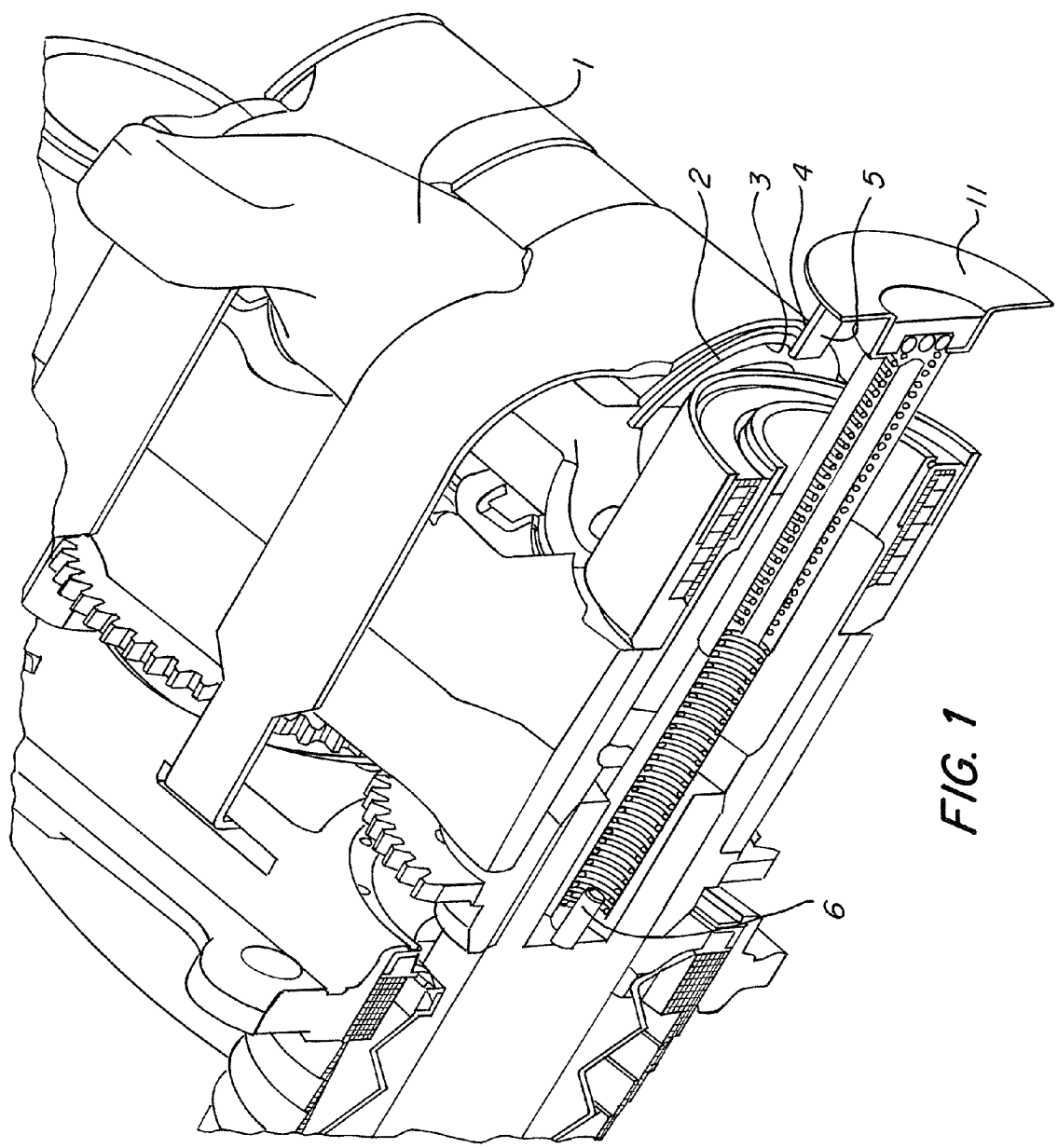
FIG. 1 is a perspective view, partly cut-away of a brake mechanism enclosing a first embodiment of the sensor system according to the present invention.

The sensor system of the present invention is arranged in connection with a brake mechanism of a disc brake. The brake mechanism comprises a lever arm 1, which is manipulated by a brake cylinder or other actuator to actuate a braking. In the embodiment of FIG. 1 a holder 2 is fixed to the lever arm 1. The holder 2 holds a magnet 3. In the shown embodiment the holder 2 has a curvature form. When the lever arm 1 is in its rest position, i.e. no braking is occurring, the magnet 3 of the holder 2 is placed adjacent and opposite a first means 4, being a sensor. In the embodiment of FIG. 1 the first means 4 is a Hall effect sensor. The Hall effect sensor is received on a printed circuit board (electronic card) 5. The printed circuit board 5 holds the logic for the Hall effect sensor.

The sensor system of FIG. 1 further comprises a second sensor means, which in this case is a force sensor 6, monitoring the position of the adjusting mechanism. The position of the adjusting mechanism is an indication of the wear of the brake lining material of the brake pads. The first sensor means 4 is used to validate or invalidate the signal of the second sensor means 6 for monitoring the wear. Furthermore, to have accurate and comparable measurements of the wear the measurements should be performed in one and the same fixed position for the adjusting mechanism. Said fixed position is the position of the lever arm 1, when the magnet 3 is in position adjacent and opposite the first sensor 4. Thus, when the first sensor means 4 indicates that the lever arm 1 is in the correct position for measurements the signals of the second sensor means 6 is validated and may be displayed and stored. The fixed position is normally taken as the position when the brake is released.

If and when the lever arm 1 moves the holder 2 will move with it moving the magnet 3 out of the position opposite the first sensor means 4. Thereby the signals from the second sensor means 6 are invalidated considering wear until a confirmation is received that the brake is in the fixed position for measurement.

The sensor system is mainly mounted in the caliper of the disc brake. The magnet 3 and holder 2 is mounted together with the brake mechanism. The rest of the sensor system is received on a cap 11 to be fixed to the caliper, normally by means of just one screw received in a threaded opening of the caliper. As the cap 11 is fixed to the caliper the values of the second sensor means 6 are in relation to the cap 11 and, thus, to the caliper. Expressed differently the caliper gives a fixed point to which the signals of the second sensor means 6 are related. Thus, the caliper is a measuring reference.

Figure 2:
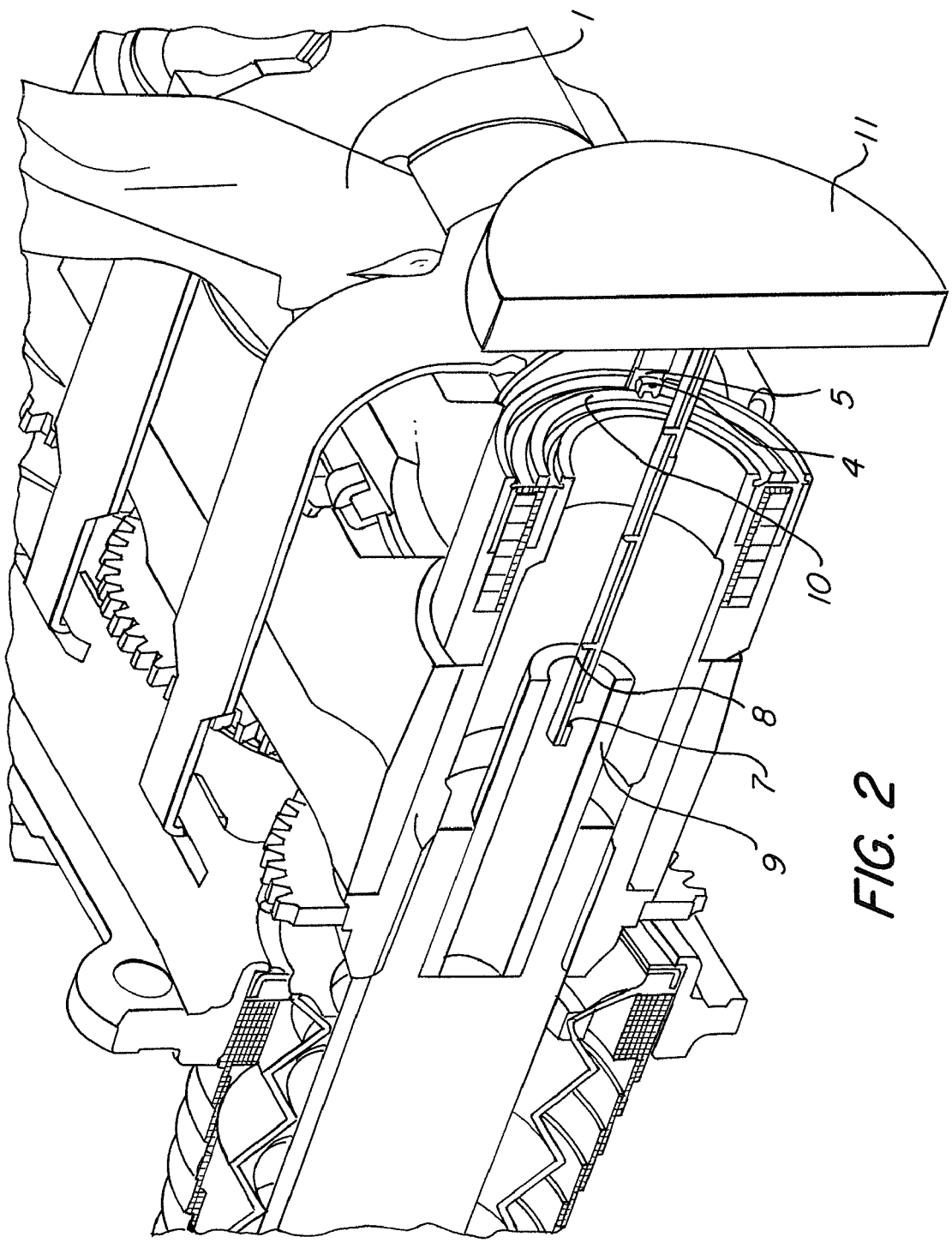
FIG. 2 is a view corresponding to FIG. 1 of a second embodiment of the present invention.

In the embodiment of FIG. 2 parts corresponding to parts of FIG. 1 are given the same reference signs. Here, the magnet has the form of a magnetic washer 10 and is mounted on a part of the adjusting means, which rotates when the lever arm 1 moves. The magnetic washer 10 is moved axially when the lever arm 1 moves. In a predetermined position for the lever arm 1 the magnet washer 10 is positioned adjacent and opposite a first means 4, being a sensor. Also in this case the first means 4 is a Hall effect sensor, received on a printed circuit board (electronic card) 5.

In the embodiment of FIG. 2 the second sensor means is a Hall effect sensor 7, received inside a magnetic tube 9. The magnetic tube 9 is placed inside the adjusting mechanism. The Hall effect sensor 7 is received inside the magnetic tube 9 without any physical contact with the magnetic tube 9. The exact position of the second sensor means 7 inside the tube 9 is used to monitor the wear of the lining material of the brake pads. It may also be used to monitor other conditions of the brake.

The principles for the embodiment of FIG. 2 correspond with the principles of the previous embodiment. Thus, the first sensor means 4 is used to validate or invalidate the measurements of the second sensor means regarding wear of the brake lining material.

The sensor system is mainly received on a cap 11 to be fixed to the caliper. As stated in relation to the embodiment of FIG. 1 the value of the second sensor means 7 is in relation to the cap 11 and, thus, the caliper.

A person skilled in the art realises that the exact form of the first means and the second sensor means of the sensor system may vary. The main conditions are that the first means should be able to function more or less as an on-off switch, while the second sensor means should be able to establish the exact position for a key part. Instead of using magnets and Hall effect sensors, sensors based on light, sound etc. or mechanical sensors, electrical transducers or GMR sensors etc. may be used. Even though the second sensor means is shown as a device moving inside a tube or the like, a person skilled in the art realises that the second sensor means may have many different forms. For example it is possible to have a fixed part in the middle surrounded by a moveable part.

Furthermore, the signals of the second sensor means may be used to monitor a braking stroke of the brake mechanism, if a first signal is received indicating that braking is occurring.

The sensor system is normally software controlled. A person skilled in the art realises that the sensor system of the present invention may be used with any type of communication between the different parts and with any suitable type of signals. Thus, in addition to the normally used lines communication by means of radio, light etc. may be used. It is also possible to use both digital and analogous signals. Furthermore, the sensor system may have its own power supply.

The first means is used to establish a fixed point for measurements. Said fixed point is normally at the rest position of the lever arm 1, but it may be positioned anywhere along the way of movement of the lever arm 1. As long as the measurements of the second sensor means is taken in the same position for the lever arm 1, the wear of the lining material may be calculated based on the movements sensed by the second sensor. As indicated above it is also possible to use a logic circuit or already available signals from an existing control and monitoring system of the vehicle to indicate if the brake is in a released position or not. If a logic circuit is used or existing signals are available no first means is needed in the sensor system as such.

Figure 3:
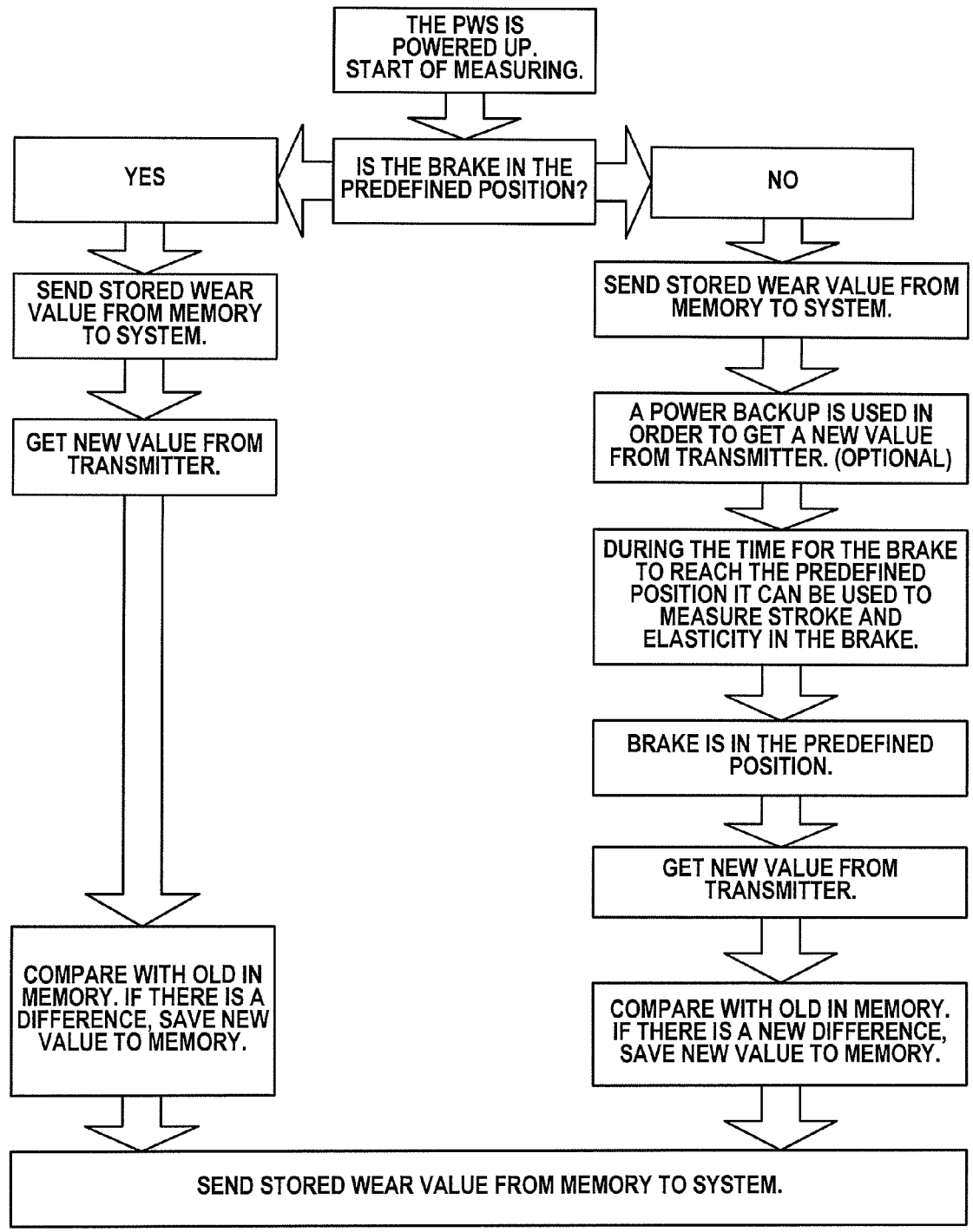
FIG. 3 is one example of a flow chart for a sensor system according to the present invention.

One example of the function of the sensor system according to the present invention is as follows and as indicated in FIG. 3.

When a brake lining wear indication is demanded a first signal is received either from the first means of the sensor system or from an external means indicative of the occurrence or braking. If the first signal confirms that the brake is in the predefined fixed position, the stored value is compared with the new value from the second sensor means. The memory is updated with the new value if there is a difference to the previously stored value.

If the first signal indicates that the brake is not in the predefined fixed position, a power backup may be used in order to get a new value from the second sensor means. The power backup is optional and is normally only used for systems that are powering up the sensors during the brake application. When the first means or any other means indicates that the brake is in the predefined position, the value of the second sensor means is compared with the stored value. If there is a difference the memory is updated with the new value. The stored value of the memory is always accessible for the control and monitoring system of the vehicle and, thus, for the driver.

Figure 4:
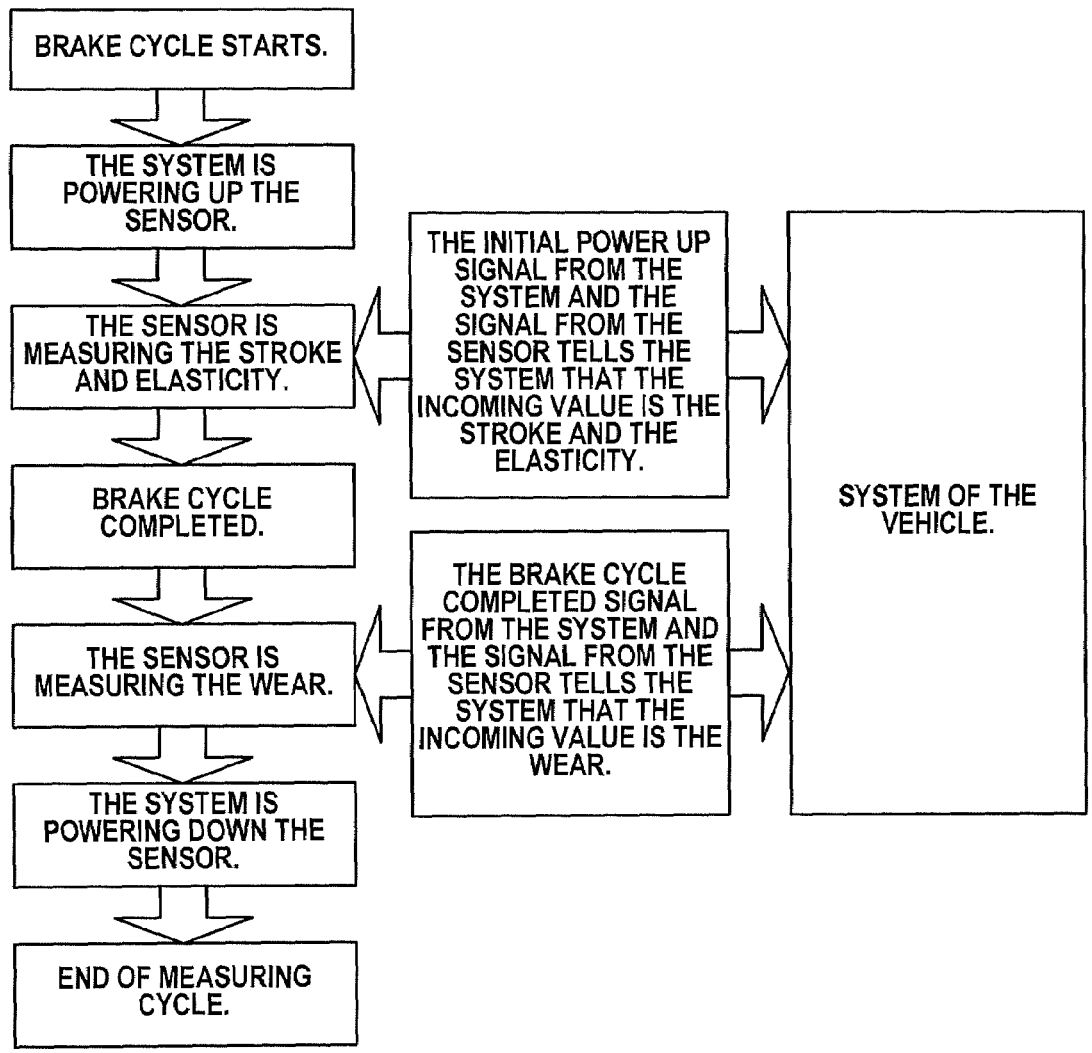
FIG. 4 is a flow chart of one possible measuring cycle using the present invention.

In FIG. 4 an example of a measuring cycle is shown measuring the stroke of the brake actuation as well as the wear of the brake lining material. When the start of a brake cycle is detected the sensors are powered up. During the brake cycle the values of the second sensor means are read as the stroke of the brake actuation. When the brake cycle is completed and the predefined fixed position is sensed, the values of the second sensor are read as the wear of the lining material. In correspondence with the flow chart of FIG. 3 the memory is updated with the latest read value of wear if there is a difference to the stored value.

A person skilled in the art realises that the flow charts of the sensor system according to the present invention may be varied depending on the actual sensor means used and the information wanted.

What is claimed is:

1. A method for monitoring at least two different conditions of a disc brake actuated by a lever arm, comprising sensing the position of a part of a disc brake using a calliper of the disc brake as a measuring reference, characterized in that the sensed position measures a wear of a brake lining material and a stroke of a brake actuation.

2. The method of claim 1, characterized in that an establishment whether a brake cycle has started or not is used to determine which type of measurement that is possible at that moment.

3. The method of claim 2, characterized in that the wear of the brake lining material is only measured when it is confirmed that the brake is in a predefined fixed position.

4. The method of claim 1, characterized in that a signal indicating the wear of the brake lining material is used to update a memory.

5. A method for monitoring at least two different conditions of a disc brake actuated by a lever arm comprising the steps of:
   sensing a position of a part of a disc brake using a calliper of the disc brake as a measuring reference;
   monitoring the occurrence of disc brake actuation with a first sensor at the sensed position;
   producing a signal indicative of the occurrence of disc brake actuation;
   monitoring the actual position of a part indicative of wear of disc brake lining material with a second sensor that uses a caliper of the disc brake as a measuring reference at the sensed position; and
   producing a signal indicative of the wear of the disc brake lining material.

* * * * *